US010294120B2

(12) United States Patent
Oshita et al.

(10) Patent No.: US 10,294,120 B2
(45) Date of Patent: May 21, 2019

(54) NICKEL COMPOSITE HYDROXIDE AND PROCESS FOR PRODUCING SAME

(71) Applicant: SUMITOMO METAL MINING CO., LTD., Tokyo (JP)

(72) Inventors: Hiroko Oshita, Ehime (JP); Kazuomi Ryoshi, Ehime (JP); Masanori Takagi, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 183 days.

(21) Appl. No.: 15/523,568

(22) PCT Filed: Oct. 20, 2015

(86) PCT No.: PCT/JP2015/079491
§ 371 (c)(1),
(2) Date: May 1, 2017

(87) PCT Pub. No.: WO2016/067960
PCT Pub. Date: May 6, 2016

(65) Prior Publication Data

US 2017/0305757 A1 Oct. 26, 2017

(30) Foreign Application Priority Data

Oct. 30, 2014 (JP) ................................ 2014-221859
Jun. 23, 2015 (JP) ................................ 2015-125811

(51) Int. Cl.

| | |
|---|---|
| ***C01G 53/04*** | (2006.01) |
| ***H01M 4/525*** | (2010.01) |
| ***H01M 4/131*** | (2010.01) |
| ***H01M 10/0525*** | (2010.01) |
| ***C01G 53/00*** | (2006.01) |

(52) U.S. Cl.
CPC .......... *C01G 53/04* (2013.01); *C01G 53/006* (2013.01); *H01M 4/131* (2013.01); *H01M 4/525* (2013.01); *H01M 10/0525* (2013.01); *C01P 2004/10* (2013.01); *C01P 2004/20* (2013.01); *C01P 2004/32* (2013.01); *C01P 2004/45* (2013.01); *C01P 2004/51* (2013.01); *C01P 2004/61* (2013.01); *C01P 2006/12* (2013.01); *C01P 2006/80* (2013.01)

(58) Field of Classification Search
CPC .... H01M 4/131; H01M 4/525; C01G 53/006; C01G 53/04
USPC ........................................................ 429/223
See application file for complete search history.

(56) References Cited

U.S. PATENT DOCUMENTS

2007/0298512 A1 12/2007 Park et al.
2011/0143139 A1* 6/2011 Maddan .................. A62D 3/36 428/402
2012/0104311 A1 5/2012 Levasseur et al.
2013/0108921 A1 5/2013 Kase et al.
2013/0314051 A1 11/2013 Takezawa
2013/0337331 A1* 12/2013 Mori .................... H01M 4/505 429/223

FOREIGN PATENT DOCUMENTS

EP 1 837 936 A2 9/2007
EP 2 763 220 A2 8/2014
EP 3239103 A1 11/2017
JP H08-213015 A 8/1996
JP H09-129230 A 5/1997
JP 2012-518871 A 8/2012
JP 2014-156397 A 8/2014
JP 2015-128004 A 7/2015
JP 2015-191848 A 11/2015

OTHER PUBLICATIONS

May 18, 2018 Extended Search Report issued in European Patent No. 15853848.8.
Yongseon et al, "Synthesis of High-Density Nickel Cobalt Aluminum Hydroxide by Continuous Coprecipitation Method," ACS Applied Materials & Interfaces, vol. 4, No. 2, Feb. 22, 2012, pp. 586-589.
Dec. 8, 2015 Search Report issued in International Patent Application No. PCT/JP2015/079491.

* cited by examiner

*Primary Examiner* — James M Erwin
(74) *Attorney, Agent, or Firm* — Oliff PLC

(57) ABSTRACT

A nickel composite hydroxide containing reduced amounts of sulfate radicals and chlorine as impurities. The nickel composite hydroxide is represented by $Ni_{1-x-y}Co_xAl_y(OH)_{2+\alpha}(0.05\leq x\leq 0.01\leq y\leq 0.2,\ x+y<0.4,\ \text{and}\ 0\leq\alpha<0.5)$, and includes spherical secondary particles formed by aggregation of plurality of plate-shaped primary particles, secondary particles have an average particle diameter of 3-20 μm, sulfate radical content of 1.0 mass % or less, chlorine content of 0.5 mass % or less, and carbonate radical content of 1.0-2.5 mass %. The nickel composite hydroxide is obtained by a process including a crystallization step in which crystallization is performed in reaction solution obtained by adding alkali solution to aqueous solution containing mixed aqueous solution containing nickel and cobalt, ammonium ion supplier, and aluminum source. The alkali solution is mixed aqueous solution of alkali metal hydroxide and carbonate, and ratio of carbonate to alkali metal hydroxide in mixed aqueous solution represented by $[CO_3^{2-}]/[OH^-]$=0.002 or more but 0.050 or less.

10 Claims, No Drawings

NICKEL COMPOSITE HYDROXIDE AND PROCESS FOR PRODUCING SAME

BACKGROUND OF THE INVENTION

Field of the Invention

The present invention relates to a nickel composite hydroxide as a precursor of a positive electrode active material used as a positive electrode material in a non-aqueous electrolyte secondary battery such as a lithium ion secondary battery, and a process for producing the same. This application is based upon and claims the benefit of priority from prior Japanese Patent Application No. 2014-221859 filed on Oct. 30, 2014 in Japan and prior Japanese Patent Application No. 2015-125811 filed on Jun. 23, 2015 in Japan.

Description of Related Art

In recent years, there has been a strong demand for the development of compact and lightweight non-aqueous electrolyte secondary batteries having a high energy density due to the widespread use of portable electronic devices such as mobile phones and notebook computers. Further, there has been a strong demand for the development of high-power secondary batteries as batteries for electric cars including hybrid cars. Examples of secondary batteries that satisfy such requirements include lithium ion secondary batteries. A lithium ion secondary battery includes a negative electrode, a positive electrode, and an electrolyte, and uses materials that can release and occlude lithium as a negative electrode active material and a positive electrode active material.

Lithium ion secondary batteries are now actively being researched and developed. Particularly; lithium ion secondary batteries using, as a positive electrode material, a layered or spinel-type lithium metal composite oxide can provide a 4 V-class high voltage, and are therefore practically used as batteries having a high energy density.

Many lithium ion secondary batteries using a lithium cobalt composite oxide ($LiCoO_2$), which can be relatively easily synthesized, as a positive electrode material have been developed to achieve an excellent initial capacity characteristic and an excellent cycle characteristic, and various results have already been obtained. However, a lithium cobalt composite oxide is synthesized using a rare and expensive cobalt compound as a raw material, which increases not only the cost of an active material but also the cost of a battery. Therefore, there has been a demand for the development of an alternative tic a lithium cobalt composite oxide as an active material.

For this reason, attention has been given to a lithium nickel composite oxide ($LiNiO_2$) that uses nickel cheaper than cobalt but is expected to have a higher capacity. A lithium nickel composite oxide has been actively developed not only from the aspect of costs but also from the following aspects: since a lithium nickel composite oxide has a lower electrochemical potential than a lithium cobalt composite oxide, decomposition due to oxidation of an electrolyte is less likely to become a problem, and therefore a higher capacity can be expected, and further a high battery voltage can be achieved as in the case of a cobalt-based composite oxide.

However, a lithium nickel composite oxide has a drawback that when a lithium ion secondary battery is produced using, as a positive electrode active material, a material purely synthesized using only nickel, the battery is inferior in cycle characteristic to a battery using a cobalt-based composite oxide, or when the battery is used or stored in a high-temperature environment, its battery performance is relatively easy to be impaired.

In order to overcome such a drawback, for example, Patent Literature 1 proposes a lithium-containing composite oxide represented by $Li_xNi_aCo_bM_cO_2$($0.8 \leq x \leq 1.2$, $0.01 \leq a \leq 0.99$, $0.01 \leq b \leq 0.99$, $0.01 \leq c \leq 0.3$, $0.8 \leq a+b+c \leq 1.2$, and M is at least one element selected from Al, V, Mn, Fe, Cu, and Zn), which is intended to improve the self-discharge characteristic and the cycle characteristic of a lithium ion secondary battery.

Patent Literature 2 proposes a lithium-containing composite oxide as a positive electrode active material for non-aqueous electrolyte secondary batteries having a high capacity and an excellent cycle characteristic, which is represented by $LiNi_xM_{1-x}O_2$ (M is at least one selected from Co, Mn, Cr, Fe, V, and Al, and $1>x \geq 0.5$).

Patent Literature 1: JP H08-213015 A

Patent Literature 2: JP H09-129230 A

The lithium nickel composite oxides obtained by production processes disclosed in Patent Literatures 1 and 2 have both a higher charge capacity and a higher discharge capacity than a lithium cobalt composite oxide and also have an improved cycle characteristic. However, the discharge capacity is lower than the charge capacity only in the first charge-discharge cycle, which causes a problem that a so-called irreversible capacity defined as a difference between them is high.

A lithium nickel composite oxide is usually produced through a step in which a nickel composite hydroxide is mixed with a lithium compound, and the Mixture is calcined. The nickel composite hydroxide contains impurities such as sulfate radicals derived from a raw material used in the production process thereof. These impurities often inhibit a reaction with lithium in the step of mixing with a lithium compound and calcining the mixture, which reduces the crystallinity of a resulting lithium nickel composite oxide having a layered structure.

Such a lithium nickel composite oxide having low crystallinity causes a problem that when a battery is produced using it as a positive electrode material, lithium diffusion in a solid phase is inhibited so that the capacity of the battery is reduced. Further, the impurities contained in the nickel composite hydroxide remain even in a lithium nickel composite oxide obtained by mixing the nickel composite hydroxide and a lithium compound and calcining the mixture. These impurities do not contribute to a charge-discharge reaction, and therefore when a battery is produced, an excess negative electrode material needs to be used which corresponds to the irreversible capacity of a positive electrode material. As a result, the capacity of the battery as a whole per weight and volume is reduced, and excess lithium accumulated in a negative electrode as an irreversible capacity is a problem also in terms of safety.

For this reason, there is a demand for a lithium nickel composite oxide having a lower impurity content. However, in order to obtain such a lithium nickel composite oxide, a nickel composite hydroxide having a low impurity content needs to be obtained.

It is therefore an object of the present invention to provide a nickel composite hydroxide as a precursor of a positive electrode active material that makes it possible to obtain a high-capacity non-aqueous electrolyte secondary battery by reducing the amounts of impurities that inhibit a reaction with lithium and do not contribute to a charge-discharge reaction, and a process for producing such a nickel composite hydroxide.

SUMMARY OF THE INVENTION

The present inventors have intensively studied, and as a result have found that impurities such as sulfate radicals can be reduced by using, as an alkali solution, a mixed solution of an alkali metal hydroxide and a carbonate in the process of producing a nickel composite hydroxide by a crystallization reaction. This finding has led to the completion of the present invention.

In order to achieve the above object, the present invention is directed to a nickel composite hydroxide represented by a general formula: $Ni_{1-x-y}Co_xAl_y(OH)_{2+\alpha}$($0.05 \leq x \leq 0.35$, $0.01 \leq y \leq 0.2$, $x+y<0.4$, and $0 \leq a \leq 0.5$), the nickel composite hydroxide including spherical secondary particles formed by aggregation of a plurality of plate-shaped primary particles, wherein the secondary particles have an average particle diameter of 3 μm to 20 μm, a sulfate radical content of 1.0 mass % or less, a chlorine content of 0.5 mass % or less, and a carbonate radical content of 1.0 mass % to 2.5 mass %.

Further, in order to achieve the above object, the present invention is also directed to a process for producing a nickel composite hydroxide by a crystallization reaction, the process including a crystallization step in which crystallization is performed by adding an alkali solution to a reaction solution containing a mixed aqueous solution containing nickel and cobalt, an ammonium ion supplier, and an aluminum source, wherein the alkali solution is a mixed aqueous solution of an alkali metal hydroxide and a carbonate, and a ratio of the carbonate to the alkali Metal hydroxide in the mixed aqueous solution represented by $[CO_3^{2-}]/[OH^-]$ is 0.002 or more but 0.050 or less.

According to the present invention, it is possible to obtain a nickel composite hydroxide with a low impurity content that makes it possible to obtain a positive electrode active material for non-aqueous electrolyte secondary batteries with a low irreversible capacity. Further, the present invention makes it possible to easily produce such a nickel composite hydroxide and-achieves high productivity, and therefore has a very great industrial value.

Hereinbelow, a nickel composite hydroxide according to the present invention and a process for producing the same will be described in detail. It is to be noted that the present invention is not limited to the following detailed description unless otherwise specified. Embodiments according to the present invention will be described in the following order.

1. Nickel Composite Hydroxide
2. Process for Producing Nickel Composite Hydroxide
3. Positive Electrode Active Material for Non-Aqueous Electrolyte Secondary Battery
4. Process for Producing Positive Electrode Active Material for Non-Aqueous Electrolyte Secondary Battery
5. Non-Aqueous Electrolyte Secondary Battery <1. Nickel Composite Hydroxide>

A nickel composite hydroxide according to the present invention is represented by a general formula: $Ni_{1-x-y}Co_xAl_y(OH)_{2+\alpha}$($0.05 \leq x \leq 0.34$, $0.01 \leq y \leq 0.2$, $x+y<0.4$, and $0 \leq \alpha \leq 0.5$), and includes spherical secondary particles formed by aggregation of a plurality of plate-shaped primary particles, wherein the secondary particles have an average particle diameter of 3 μm to 20 μm, a sulfate radical content of 1.0 mass % or less, a chlorine content of 0.5 mass % or less, and a carbonate radical content of 1.0 mass % to 2.5 mass %. Hereinbelow, each of the components will be described in detail.

[Composition of Particle]

The nickel composite hydroxide is in a particulate form, and is adjusted to have a composition represented by a general formula: $Ni_{1-x-y}Co_xAl_y(OH)_{2+\alpha}$($0.05 \leq x \leq 0.35$, $0.01 \leq y \leq 0.2$, $x+y<0.4$, and $0 \leq \alpha \leq 0.5$).

In the above general formula, x representing a cobalt content satisfies $0.05 \leq x \leq 0.35$. By appropriately adding cobalt, a resulting positive electrode active material can have an excellent cycle characteristic, and the expansion and shrinkage behavior of a crystal lattice caused by extraction and insertion of Li during charge and discharge can be reduced. If the cobalt content is as low as less than 0.05, such desired effects cannot be obtained, which is undesirable. On the other hand, if the cobalt content is as high as more than 0.35, the initial discharge capacity of a resulting positive electrode active material is undesirably significantly reduced, and further a problem such as cost disadvantage is undesirably caused. For this reason, x representing the cobalt content needs to satisfy $0.05 \leq x \leq 0.35$. Further, in consideration of the battery characteristic and cost of a resulting positive electrode active material, it is preferred that x satisfies $0.07 \leq x \leq 0.25$, and it is more preferred that x substantially satisfies $0.10 \leq x \leq 0.20$.

Further, y representing an aluminum content satisfies $0.01 \leq y \leq 0.2$, preferably $0.01 \leq y \leq 0.1$. By adding aluminum so that y is in the above range, it is possible to improve the durability and safety of a battery using a resulting positive electrode active material as a positive electrode active material. Particularly, when the nickel composite hydroxide is adjusted so that aluminum is uniformly distributed in particles of the nickel composite hydroxide, there is an advantage that the particles as a whole can have the above effect, and therefore even when the amount of aluminum added is the same, a higher effect can be obtained and a reduction in capacity can be suppressed. If the amount of aluminum added is too small so that y is less than 0.01, such a desired effect cannot be obtained, which is undesirable. On the other hand, if the amount of aluminum added it too large so that y exceeds 0.2, metal elements that contribute to a Redox reaction are decreased so that the battery capacity of a resulting positive electrode active material is undesirably reduced. Further, the total atomic ratio of cobalt and aluminum satisfies $x+y<0.4$. If the total atomic ratio of cobalt and aluminum exceeds 0.4, the capacity of a resulting positive electrode active material is significantly reduced.

A method for analyzing the composition is not particularly limited, but the composition may be determined from chemical analysis by ICP emission spectroscopy.

[Particle Structure]

The nickel composite hydroxide includes spherical secondary particles formed by aggregation of a plurality of primary particles. The primary particles constituting the secondary particles may have various shapes such as a plate shape, a needle-like shape, a rectangular parallelepiped shape, an elliptical shape, and a rhombohedral shape. Further, the primary particles may be aggregated in random directions. Alternatively, the primary particles aggregated radially from the center along the major axis direction thereof may also be applicable in the present invention.

The secondary particles are preferably formed by aggregation of a plurality of plate shaped and/or needle-like shaped primary particles in random directions. The reason for this is that when the secondary particles have such a structure, voids are substantially uniformly created among the primary particles, and therefore when the nickel composite hydroxide is mixed with a lithium compound and the mixture is calcined, the fused lithium compound is distributed in the secondary particles so that lithium is satisfactorily diffused.

It is to be noted that a method for observing the shapes of the primary particles and the secondary particles is not particularly limited, but the primary particles and the secondary particles may be measured by observing the cross-section of the nickel composite hydroxide with a scanning electron microscope.

[Average Particle Diameter]

The nickel composite hydroxide is adjusted to have an average particle diameter of 3 μm to 20 μm. If the average particle diameter is less than 3 μm, the filling density of particles in a positive electrode formed using a resulting positive electrode active material is reduced so that a battery capacity per volume of the positive electrode is undesirably reduced. On the other hand, if the average particle diameter exceeds 20 μm, the specific surface area of a resulting positive electrode active material is reduced so that the interface between the positive electrode active material and an electrolyte of a battery is reduced, which undesirably increases the resistance of a positive electrode and deteriorates the output characteristic of the battery. Therefore, when the average particle diameter of the nickel composite hydroxide is adjusted to 3 to 20 μm, preferably 3 to 15 μm, more preferably 4 to 12 μm, a battery having a positive electrode using a resulting positive electrode active material can have a high battery capacity per volume, a high level of safety, and an excellent cycle characteristic.

A method for measuring the average particle diameter is not particularly limited. For example, the average particle diameter may be determined from a volumetric integration value measured by a laser light diffraction-scattering-type particle size analyzer.

[Impurity Content]

The nickel composite hydroxide contains sulfate radicals and chlorine as impurities. The sulfate radicals and chlorine are derived from raw materials used in a crystallization step that will be described later. The nickel composite hydroxide has a sulfate radical content of 1.0 mass % or less, preferably 0.6 mass % or less and a chlorine content of 0.5 mass % or less, preferably 0.3 mass % or less.

If the sulfate radical content of the nickel composite hydroxide exceeds 1.0 mass %, in the step of mixing with a lithium compound and calcining the mixture, a reaction with lithium is inhibited, which reduces the crystallinity of a resulting lithium nickel composite oxide having a layered structure. Such a lithium nickel composite oxide having low crystallinity causes a problem that when a battery is produced using it as a positive electrode material, lithium dispersion in a solid phase is inhibited so that the capacity of the battery is reduced. Further, the impurities contained in the nickel composite hydroxide remain even in a lithium nickel composite oxide obtained by mixing the nickel composite hydroxide with a lithium compound and calcining the mixture. These impurities do not contribute to a charge-discharge reaction, and therefore when a battery is produced, an excess negative electrode material needs to be used which corresponds to the irreversible capacity of a positive electrode material. As a result, the capacity of the battery as a whole per weight and volume is reduced, and excess lithium accumulated in a negative electrode as an irreversible capacity is a problem also in terms of safety On the other hand, if the chlorine content exceeds 0.5 mass %, there are a problem such as a reduction in battery capacity and a safety problem as described above with reference to the sulfate radical. Further, chlorine remains in a resulting lithium nickel composite oxide mainly in the form of LiCl or NaCl. They are highly hygroscopic and therefore allow moisture to enter a battery, which causes a deterioration of the battery.

[Carbonate Radical Content]

The nickel composite hydroxide has a carbonate radical content of LO mass % to 2.5 mass %. Here, carbonate radicals contained in the nickel composite hydroxide are derived from a carbonate used in a crystallization step that will be described later. Further, the carbonate radicals are volatilized in the step of mixing the nickel composite hydroxide with a lithium compound and calcining the mixture, and therefore do not remain in a resulting lithium nickel composite oxide used as a positive electrode material. When the carbonate radical content of the nickel composite hydroxide is in the range of 1.0 mass % to 2.5 mass %, pores are formed in the particles of the nickel composite hydroxide by volatilization of carbonate radicals contained in the nickel composite hydroxide during calcination of a mixture of the nickel composite hydroxide and a lithium compound so that the nickel composite hydroxide can appropriately come into contact with the fused lithium compound, which appropriately grows crystals of a lithium nickel composite oxide. The carbonate radical content may be determined by, for example, measuring the total carbon element content of the nickel composite hydroxide and converting the measured total carbon element content into the amount of $CO_3$.

On the other hand, if the carbonate radical content is less than 1.0 mass %, when the nickel composite hydroxide is mixed with a lithium compound and the mixture is calcined, the nickel composite hydroxide is in insufficient contact with the fused lithium compound. Therefore, a resulting lithium nickel composite oxide has low crystallinity; and when a battery is produced using such a lithium nickel composite oxide as a positive electrode material, there is a problem that the capacity of the battery is reduced due to inhibition of Li diffusion in a solid phase. If the carbonate radical content exceeds 2.5 mass %, in the, step of mixing the nickel composite hydroxide with a lithium compound and calcining the mixture to obtain a lithium nickel composite oxide, generated carbon dioxide gas inhibits a reaction, which reduces the crystallinity of the lithium nickel composite oxide.

[Particle Size Distribution]

The nickel composite hydroxide is preferably adjusted so that the value of [(d90−d10)/average particle diameter], which is an index indicating the dispersion of particle size distribution of particles, is 0.55 or less.

When the nickel composite hydroxide has a wide particle size distribution and therefore the value of [(d90−d10)/average particle diameter], which is an index indicating the dispersion of particle size distribution, exceeds 0.55, the nickel composite hydroxide contains many fine particles whose particle diameters are much smaller than the average particle diameter or many particles (large-diameter particles) whose particle diameters are much larger than the average particle diameter. When a positive electrode is formed using a positive electrode active material containing many fine particles, there is a possibility that a local reaction of the fine particles occurs so that heat is generated is generated, which is undesirable because safety is reduced and a cycle characteristic is deteriorated due to selective degradation of the fine particles having a large specific surface area. On the other hand, when a positive electrode is formed using a positive electrode active material containing many large-diameter particles, an adequate reaction area between an electrolyte and the positive electrode active material is not provided so that the output of a battery is undesirably reduced due to an increase in reaction resistance.

Therefore, when the positive electrode active material is adjusted so that the value of [(d90−d10)/average particle diameter], which is an index indicating the dispersion of particle size distribution of particles, is 0.55 or less, the ratio of fine particles or large-diameter particles is low, and therefore a battery having a positive electrode using the positive electrode active material can have a high level of safety and an excellent cycle characteristic and can output a high power It is to be noted that in [(d90−d10)/average particle diameter] that is an index indicating the dispersion of particle size distribution, d10 means a particle diameter at which the cumulative volume of particles reaches 10% of the total volume of all the particles when the number of particles is counted from a small particle size side. Further, d90 means a particle diameter at which the cumulative volume of particles reaches 90% of the total volume of all the particles when the number of particles is counted from a small particle size side.

A method for determining the average particle diameter, d90, and d10 is not particularly limited. For example, the average particle diameter; d90, and d10 may be determined from a volumetric integration value measured by a laser light diffraction-scattering-type particle size analyzer.

[Specific Surface Area]

The nickel composite hydroxide is preferably adjusted to have a specific surface area of 15 $m^2/g$ to 60 $m^2/g$. This is because when the nickel composite hydroxide having a specific surface area in the range of 15 $m^2/g$ to 60 $m^2/g$ is mixed with a lithium compound and the mixture is calcined, the particles of the nickel composite hydroxide can have a sufficient surface area to come into contact with the fused lithium compound. On the other hand, if the specific surface area is less than 15 $m^2/g$, there is a problem that when the nickel composite hydroxide is mixed with a lithium compound and the mixture is calcined, the nickel composite hydroxide cannot sufficiently come into contact with the fused lithium compound so that a resulting lithium nickel composite oxide has low crystallinity, which reduces the capacity of a battery using the lithium nickel composite oxide as a positive electrode material due to inhibition of Li diffusion in a solid phase. If the specific surface area exceeds 60 $m^2/g$, when the nickel composite hydroxide is mixed with a lithium compound and the mixture is calcined, crystal growth excessively proceeds so that nickel enters the lithium layers of a resulting lithium transition metal composite oxide that is a layered compound, that is, cation mixing occurs, which undesirably reduces a charge-discharge capacity.

<2. Process for Producing Nickel Composite Hydroxide>

A process for producing a nickel composite hydroxide is a process in which the above-described nickel composite hydroxide is produced by a crystallization reaction. The process for producing a nickel composite hydroxide include: a nucleation step in which nucleation is performed in a reaction solution (hereinafter, also referred to as "aqueous solution for nucleation") obtained by adding an alkali solution to an aqueous solution containing a mixed aqueous solution containing nickel and cobalt, an ammonium ion supplier, and an aluminum source such that the pH of the reaction solution is 12.0 to 13.4 as a pH measured on the basis of a liquid temperature of 25° C.; and a particle growth step in which nuclei formed in the nucleation step are grown by adding an alkali solution to the reaction solution containing the nuclei (hereinafter, also referred to as "aqueous solution for particle growth") such that the pH of the reaction solution is 10.5 to 12.0 as a pH measured on the basis of a liquid temperature of 25° C. As the alkali solution, a mixed aqueous solution of an alkali metal hydroxide and a carbonate is used. The mixing ratio of the alkali metal hydroxide and the carbonate in the mixed aqueous solution represented by $[CO_3^{2-}]/[OH^-]$ is 0.002 or more but 0.050 or less.

In a conventional continuous crystallization process, a nucleation reaction and a particle growth reaction proceed at the same time in the same reaction vessel, and therefore a nickel composite hydroxide having a wide particle size distribution is obtained. On the other hand, in the process for producing a nickel composite hydroxide according to the present invention, the time when a nucleation reaction mainly occurs (nucleation step) and the time when a particle growth reaction mainly occurs (particle growth step) are clearly separated from each other. Therefore, even when both the steps are performed in the same reaction vessel, a composite hydroxide having a narrow particle size distribution can be obtained.

Hereinbelow, each of the steps will be described in detail.

[Nucleation Step]

In the nucleation step, nuclei of a nickel composite hydroxide are formed in a reaction solution (solution for nucleation) obtained by adding an alkali solution to an aqueous solution containing a mixed aqueous solution containing nickel and cobalt, an ammonium ion supplier, and an aluminum source such that the pH of the reaction solution is 12.0 to 13.4 as a pH measured on the basis of a liquid temperature of 25° C.

In the nucleation step, an aqueous sodium aluminate solution is preferably contained as the aluminum source. In this case, the mole ratio of sodium to aluminum (MAD in the aqueous sodium aluminate solution is preferably 1.5 to 3.0. The ammonium concentration of the reaction solution is preferably adjusted to be in the range of 3 to 25 g/L.

In the nucleation step, as described above, a mixed aqueous solution containing nickel and cobalt, an ammonium ion supplier, and an aluminum source are placed in a reaction vessel, and an alkali solution is added thereto for pH adjustment to cause a crystallization reaction for forming nuclei. It is to be noted that in the nucleation step, the order of placing the mixed aqueous solution, the ammonium ion supplier, the aluminum source, and the alkali solution in the reaction vessel is not particularly limited, and they may be placed in the reaction vessel at the same time to perform nucleation.

In the nucleation step, the pH and the ammonium ion concentration of the reaction aqueous solution change as nucleation proceeds, and therefore the alkali solution and the ammonium ion supplier are appropriately supplied to the reaction aqueous solution in the reaction vessel together with the nickel cobalt mixed aqueous solution so that the pH and the ammonium concentration of the reaction aqueous solution are controlled to be maintained at predetermined values.

In the nucleation step, when the mixed aqueous solution containing nickel and cobalt, the aqueous alkali solution, the ammonium ion supplier, and the aluminum source are continuously supplied to the reaction aqueous solution, continuous formation of new nuclei in the reaction aqueous solution is maintained. Then, when a predetermined amount of nuclei are formed in the reaction solution in the nucleation step, the nucleation is terminated. It is to be noted that in the nucleation step, whether or not a predetermined amount of nuclei have been formed in the reaction solution is determined based on the amounts of metal salts added to the reaction solution.

[Particle Growth Step]

In the particle growth step, a particle growth reaction is performed by adjusting the pH of the reaction solution containing nuclei formed in the nucleation step (aqueous solution for particle growth) to 10.5 to 12.0 as a pH measured on the basis of a liquid temperature of 25° C. so that particles of a nickel composite hydroxide are obtained. More specifically, the pH of the reaction aqueous solution is controlled by adding an inorganic acid that is of the same type as an acid constituting the metal compounds, for example, sulfuric acid or by adjusting the amount of the aqueous alkali solution to be supplied.

In the particle growth step, when the pH of the aqueous solution for particle growth is 12.0 or less, the nuclei in the aqueous solution for particle growth grow so that a nickel composite hydroxide having a predetermined particle diameter is formed. In the particle growth step, the pH of the aqueous solution for particle growth is in the range of 10.5 to 12.0, and therefore a nucleus growth reaction preferentially occurs as compared to a nucleation reaction so that new nuclei are hardly formed in the aqueous solution for particle growth.

Then, in the particle growth step, the particle growth reaction is terminated when a predetermined amount of the nickel composite hydroxide having a predetermined particle diameter is formed in the aqueous solution for particle growth. It is to be noted that in the particle growth step, the amount of the formed nickel composite hydroxide having a predetermined particle diameter is determined based on the amounts of metal salts added to the reaction aqueous solution.

Hereinbelow, materials acid conditions used in the nucleation step and the particle growth step will be described.

(Mixed Aqueous Solution Containing Nickel and Cobalt)

Salts such as a nickel salt and a cobalt salt for use in the mixed aqueous solution containing nickel and cobalt are not particularly limited as long as they are water-soluble compounds, and examples thereof include sulfates, nitrates, and chlorides. For example, nickel sulfate and cobalt sulfate are preferred.

The concentration of the mixed aqueous solution preferably 1 mol/L to 2.6 mol/L, more preferably 1 mol/L to 2.2 mol/L as the total concentration of the metal salts. If the concentration of the mixed aqueous solution is less than 1 mol/L, the concentration of a resulting hydroxide slurry is low, which deteriorates productivity. On the other hand, if the concentration of the mixed aqueous solution exceeds 2.6 mol/L, there is a fear that crystal precipitation or freezing occurs at −5° C. or less so that pipes of equipment are clogged, and therefore the pipes need to be kept warm or heated, which increases costs.

Further, the amount of the mixed aqueous solution to be supplied to the reaction vessel is adjusted so that the concentration of a crystallized product at the time when the crystallization reaction is terminated is generally 30 g/L to 250 g/L, preferably 80 g/L to 150 g/L. If the concentration of a crystallized product is less than 30 g/L, there is a case where primary particles are poorly aggregated if the concentration of a crystallized product exceeds 250 g/L, there is a case where the mixed aqueous solution added is not satisfactorily diffused in the reaction vessel so that particles do not uniformly grow.

(Ammonium Ion Supplier)

The ammonium ion supplier is not particularly limited as long as it is a water-soluble compound, and examples of the ammonium ion supplier to be used include ammonia, ammonium sulfate, ammonium chloride, ammonium carbonate, and ammonium fluoride. For example, ammonia or ammonium sulfate is preferably used.

The ammonium ion supplier is supplied to the reaction solution so that the concentration of ammonia in the reaction solution is preferably 3 g/L to 25 g/L, more preferably 5 g/L to 20 g/L, even more preferably 5 g/L to 15 g/L. When ammonium ions are present in the reaction solution, metal ions, especially, Ni ions form an ammine complex so that the solubility of metal ions is increased. This promotes the growth of primary particles so that dense nickel composite hydroxide particles are likely to be obtained. Further, since the solubility of metal ions is stabilized, nickel composite hydroxide particles uniform in shape and particle diameter are likely to be obtained. Particularly, when the concentration of ammonia in the reaction solution is 3 g/L to 25 g/L, more dense nickel composite hydroxide particles more uniform in shape and particle diameter are likely to be obtained.

If the concentration of ammonia in the reaction solution is less than 3 g/L, there is a case where the solubility of metal ions becomes unstable, and therefore primary particles uniform in shape and particle diameter are not formed, but gel-like nuclei are formed so that nickel composite hydroxide particles having a wide particle size distribution are obtained. On the other hand, if the concentration of ammonia in the reaction solution exceeds 25 g/L, there is a case where the solubility of metal ions is excessively increased, and therefore the amount of metal ions remaining in the reaction aqueous solution is increased so that composition deviation occurs. The concentration of ammonium ions can be measured by a common ion meter.

(Alkali Solution)

The alkali solution is a mixed aqueous solution of a alkali metal hydroxide and a carbonate. The ratio of the carbonate to the alkali metal hydroxide ($[CO_3^{2-}]/[OH^-]$), which represents the mixing ratio between the alkali metal hydroxide and the carbonate, is 0.002 or more but 0.050 or less, preferably 0.005 or more but 0.030 or less, even more preferably 0.010 or more but 0.025 or less.

When the alkali solution is a mixed aqueous solution of an alkali metal hydroxide and a carbonate, anions such as sulfate radicals and chlorine that remain as impurities in a resulting nickel composite hydroxide can be ion-exchanged for carbonate radicals in the crystallization step. The carbonate radicals are volatilized in the step of mixing a resulting nickel composite hydroxide and a lithium compound and calcining the mixture, and therefore do not remain in a lithium nickel composite oxide used as a positive electrode material. Therefore, sulfate radicals and chlorine that remain as impurities in a resulting lithium nickel composite hydroxide eats be reduced by ion-exchange for carbonate radicals.

If the ratio of the carbonate to the alkali metal hydroxide ($[CO_3^{2-}]/[OH^-]$) is less than 0.002, sulfate radicals and chlorine as impurities derived from raw materials are not satisfactorily replaced with carbonate ions in the crystallization step, and therefore these impurities are likely to be incorporated into a resulting nickel composite hydroxide. On the other hand, even when $[CO_3^{2-}]/[OH^-]$ exceeds 0.050, the effect of reducing sulfate radicals and chlorine as impurities derived from raw materials is not enhanced, and therefore an excess amount of the carbonate added increases costs.

The alkali metal hydroxide is preferably at least one selected from lithium hydroxide, sodium hydroxide, and potassium hydroxide, because the amount of such a water-soluble compound to be added can be easily controlled.

The carbonate is preferably at least one selected from sodium carbonate, potassium carbonate, and ammonium carbonate, because the amount of such a water-soluble compound to be added can be easily controlled.

Further, a method for adding the alkali solution to the reaction vessel is not particularly limited, and the alkali solution may be added by a pump that can control a flow rate, such as a metering pump, so that the pH of the reaction solution is maintained in a predetermined range that will be described later.

(Aluminum Source)

The aluminum source used in the crystallization step is preferably an aqueous sodium aluminate solution. When another compound such as aluminum sulfate is used, aluminum hydroxide precipitates at a lower pH than nickel hydroxide or cobalt hydroxide, and is therefore likely to precipitate singly, which makes it impossible to obtain a nickel composite hydroxide having a narrow particle size distribution.

The aqueous sodium aluminate solution can be obtained by, for example, adding a predetermined amount of sodium hydroxide to an aqueous solution prepared by dissolving a predetermined amount of sodium aluminate in water. At this time, the mole ratio of sodium to aluminum in the aqueous sodium aluminate solution is more preferably 1.5 to 3.0. If the mole ratio of the amount of sodium, that is, the amount of sodium hydroxide is not in the range of 1.5 to 3.0, the stability of the aqueous sodium aluminate solution is reduced, and therefore aluminum hydroxide is likely to precipitate as fine particles just after or before the aqueous sodium aluminate solution is added to the reaction vessel so that a coprecipitation reaction with nickel hydroxide and cobalt hydroxide is less likely to occur, which undesirably causes a problem that. particles having a ride particle size distribution are formed, and the distribution of aluminum concentration in the particles is not uniform.

In order to uniformly disperse aluminum in resulting nickel composite hydroxide particles, the mixed aqueous solution containing nickel and cobalt and the aqueous sodium aluminate solution may be added to the reaction vessel at the same time. In this case, the metal concentrations of nickel, cobalt, and aluminum and the flow rates of the mixed aqueous solution and the aqueous sodium aluminate to be added are adjusted so that a desired composition ratio represented by the general formula can be achieved.

(pH Control)

The crystallization step more preferably includes: a nucleation step in which nucleation is performed by adding an alkali solution to an aqueous solution containing a mixed aqueous solution containing nickel and cobalt, an ammonium ion supplier, and an aluminum source such that the pH of the aqueous solution for nucleation is 12.0 to 13.4 as a pH measured on the basis of a liquid temperature of 25° C.; and a particle growth step in which nuclei formed in the nucleation step are grown by controlling a reaction solution (aqueous solution for particle growth) containing the nuclei by adding an alkali solution such that the of the reaction solution is 10.5 to 12.0 as a pH measured on the basis of a liquid temperature of 25° C. That is, a nucleation reaction and a particle growth reaction do not proceed at the same time in the same vessel, but the time when a nucleation reaction mainly occurs (nucleation step) and the time when a particle growth reaction mainly occurs (particle growth step) are clearly separated from each other.

In the nucleation step, the pH of the reaction aqueous solution is controlled to be in the range of 12.0 to 13.4, preferably 12.3 to 13.0 as a pH measured on the basis of a liquid temperature of 25° C. if the pH exceeds 13.4, there is a problem that excessively fine nuclei are formed so that the reaction aqueous solution is gelled. On the other hand, if the pH is lower than 12.0, a nucleus growth reaction occurs together with nucleation so that non-uniform nuclei are formed which have a wide particle size distribution. Therefore, when the pH of the reaction aqueous solution is controlled to be 12.0 to 13.4 in the nucleation step, almost only nucleation is allowed to occur while nucleus growth is suppressed so that uniform nuclei are formed which have a narrow particle size distribution.

On the other hand, in the particle growth step, the pH of the reaction aqueous solution needs to be controlled to be in the range of 10.5 to 12.0, preferably 11.0 to 12.0 as a pH measured on the basis of a liquid temperature of 25° C. If the pH exceeds 12.0, many nuclei are newly formed so that fine secondary particles are formed, which makes it impossible to obtain a nickel composite hydroxide having an excellent particle diameter distribution. Further, if the pH is lower than 10.5, the solubility of metal ions is increased by ammonium ions so that metal ions remaining in the solution without being precipitated are increased, which deteriorates production efficiency. That is, when the pH of the reaction aqueous solution is controlled to be 10.5 to 12.0 in the particle growth step, only the growth of nuclei formed in the nucleation step preferentially occurs so that formation of new nuclei can be suppressed, which makes it possible to obtain a uniform nickel composite hydroxide having a narrow particle size distribution.

It is to be noted that when the pH is 12, the reaction aqueous solution is under the boundary condition between nucleation and particle growth. In this case, either the nucleation step or the particle growth step may be performed depending on the presence or absence of nuclei in the reaction aqueous solution. That is, when the pH in the nucleation step is adjusted to be higher than 12 to form a large amount of nuclei and then the pH in the particle growth step is adjusted to 12, a large amount of nuclei are present in the reaction aqueous solution, and therefore nucleus growth preferentially occurs so that a nickel composite hydroxide having a narrow particle diameter distribution and a relatively large particle diameter is obtained.

On the other hand, when nuclei are not present in the reaction solution, that is, when the pH in the nucleation step is adjusted to 12, nucleation preferentially occurs because of the absence of nuclei to be grown, and therefore formed nuclei are grown by adjusting the pH in the particle growth step to less than 12 so that an excellent nickel composite hydroxide is obtained.

In either case, the pH in the particle growth step shall be controlled to be lower than the pH in the nucleation step. In order to clearly separate nucleation and particle growth from each other, the pH in the particle growth step is preferably lower than that in the nucleation step by 0.5 or more, more preferably 1.0 or more.

As described above, by dearly separating the nucleation step and the particle growth step from each other by controlling the pH, nucleation preferentially occurs and nucleus growth hardly occurs in the nucleation step, and on the other hand, only nucleus growth occurs and new nuclei are hardly formed in the particle growth step. Therefore, uniform nuclei having a narrow particle size distribution can be formed in the nucleation step, and the nuclei can be uniformly grown in the particle growth step. Therefore, the process for producing a nickel composite hydroxide makes it possible to obtain uniform nickel composite hydroxide particles having a narrow particle size distribution.

(Temperature of Reaction Solution)

The temperature of the reaction solution (aqueous solution for particle growth) in the reaction vessel is preferably set to 20 to 80° C., more preferably 30 to 70° C., even more preferably 35 to 60° C. If the temperature of the reaction solution is lower than 20° C., nucleation is likely to occur due to the low solubility of metal ions, which makes it difficult to control nucleation. On the other hand, if the temperature of the reaction solution exceeds 80° C., volatilization of ammonia is promoted, and therefore the ammonium ion supplier needs to be excessively added to maintain a predetermined ammonium ion concentration, which increases costs.

(Reaction Atmosphere)

The particle diameter and particle structure of the nickel composite hydroxide are controlled also by a reaction atmosphere in the crystallization step.

When the atmosphere in the reaction vessel during the crystallization step is controlled to be a non-oxidizing atmosphere, the growth of primary particles that constitute a nickel composite hydroxide is promoted so that secondary particles having an appropriately large particle diameter are formed from large and dense primary particles. Particularly, when the atmosphere during the crystallization step is a non-oxidizing atmosphere whose oxygen concentration is 5.0 vol % or less, preferably 2.5 vol % or less, more preferably 1.0 vol % or less, nuclei including relatively large primary particles are formed, and particle growth is promoted by aggregation of the primary particles so that secondary particles having an appropriate size can be obtained.

Such an atmosphere in the space inside the reaction vessel may be maintained by, for example, flowing an inert gas such as nitrogen into the space inside the reaction vessel and further bubbling an inert gas in the reaction solution.

In such a process for producing a nickel composite hydroxide, sulfate radicals and chlorine as impurities can be ion-exchanged for carbonate radicals to reduce residual sulfate radicals and chlorine by adjusting the ratio of the carbonate to the alkali metal hydroxide in the alkali solution ($[CO_3^{2-}]/[OH^-]$) to 0.002 or more but 0.050 or less when the alkali solution is added to the aqueous solution containing the mixed aqueous solution containing nickel and cobalt, the ammonium ion supplier, and the aluminum source. This makes it possible to obtain a nickel composite hydroxide whose sulfate radical content is 1.0 mass % or less and whose chlorine content is 0.5 mass % or less. Therefore, a positive electrode active material formed using this nickel composite hydroxide as a precursor has high crystallinity and therefore can increase a battery capacity, which makes it possible to obtain a non-aqueous electrolyte secondary battery having a high level of safety. Further; the process for producing a nickel composite hydroxide makes it possible to easily produce a nickel composite hydroxide and achieves high productivity, and therefore has a very great industrial value.

[3. Positive Electrode Active Material for Non-Aqueous Electrolyte Secondary Battery]

A positive electrode active Material for non-aqueous electrolyte secondary batteries can be obtained using the above-described nickel composite hydroxide as a precursor. The positive electrode active material includes a lithium nickel composite oxide that is formed using the nickel composite hydroxide as a raw material and that includes a hexagonal lithium-containing composite oxide having a layered structure. The lithium nickel composite oxide is adjusted to have a predetermined composition, a predetermined average particle diameter, and a predetermined particle size distribution, and therefore has an excellent cycle characteristic, a high level of safety, and a highly-uniform and small particle diameter and is suitable as a material of a positive electrode of a non-aqueous electrolyte secondary battery.

[Composition]

The positive electrode active material includes a lithium nickel cobalt aluminum composite oxide having a composition represented by a general formula:

$$Li_tNi_{1-x-y}Co_xAl_yO_2 \text{ (where } 0.97\le t\le 1.20,\ 0.05\le x\le 0.35,\ 0.01\le y\le 0.2,\ x+y<0.4).$$

In the positive electrode active material, the atomic ratio t of lithium is preferably in the above range ($0.97\le t\le 1.20$). If the atomic ratio t of lithium is lower than 0.97, the reaction resistance of a positive electrode using the positive electrode active material in a non-aqueous electrolyte secondary battery is increased, which reduces the output of the battery. On the other hand, if the atomic ratio t of lithium is higher than 1.20, the initial discharge capacity of the positive electrode active material is reduced, and in addition, the reaction resistance of a positive electrode using the positive electrode active material is also increased. For this reason, the atomic ratio t of lithium preferably satisfies $0.97\le t\le 1.20$. Particularly, the atomic ratio t of lithium is more preferably 1.05 or higher.

When the positive electrode active material contains cobalt, an excellent cycle characteristic can be achieved. This is because the expansion and shrinkage behavior of a crystal lattice caused by extraction and insertion of lithium during charge and discharge can be reduced by replacing part of nickel in the crystal lattice with cobalt. Further, the atomic ratio of cobalt preferably satisfies $0.05\le x\le 0.35$, and in consideration of a battery characteristic and safety, more preferably satisfies $0.07\le x\le 0.25$, even snore preferably $0.10\le x\le 0.20$.

The positive electrode active material is preferably adjusted so that the atomic ratio y of aluminum with respect to the atoms of all the metals other than lithium satisfies $0.01\le y\le 0.2$, more preferably $0.01\le y\le 0.1$. The reason for this is that addition of aluminum to the positive electrode active material makes it possible to improve the durability and safety of a battery using the positive electrode active material. Particularly, when the positive electrode active material is adjusted so that aluminum is uniformly distributed in particles of the positive electrode active material, there is an advantage that the particles as a whole can have the effect of improving the durability and safety of a battery, and therefore even when the amount of aluminum added is the same, a higher effect can be obtained and a reduction in capacity can be suppressed.

On the other hand, if the atomic ratio y of aluminum with respect to the atoms of all the metals other than lithium is lower than 0.01, the positive electrode active material is undesirably poor in cycle characteristic and safety Further, if the atomic ratio y of aluminum with respect to the atoms of all the metals other than lithium in the positive electrode active material exceeds 0.2, metal elements that contribute to a Redox reaction are decreased so that a battery capacity is undesirably reduced.

The positive electrode active material takes over the properties of the above-described nickel composite hydroxide as a precursor, and therefore its sulfate radical content is 1.0 mass % or less, preferably 0.6 mass % or less, its chlorine content is 0.5 mass % or less, preferably 0.3 mass % or less, and its carbonate radical content is 1.0 mass % to 2.5 mass %.

Further, the average particle diameter of the positive electrode active material is 3 μm to 25 μm, which makes it possible to increase a battery capacity per volume and to achieve a high level of safety and an excellent cycle characteristic.

The positive electrode active material has a value of [(D90-D10)/average particle diameter], which is an index indicating the dispersion of particle size distribution, of 0.55 or less, that is, the ratio of fine particles or large-diameter particles is low, and therefore a battery having a positive electrode using the positive electrode active material can have a high level of safety and an excellent cycle characteristic and can output a high power.

A process for producing a positive electrode active material is not particularly limited as long as a positive electrode active material can be produced from the above-described nickel composite hydroxide, but the following positive electrode active material production process is preferred because a positive electrode active material can be more reliably produced.

The process for producing a positive electrode active material includes: a heat treatment step in which particles of a nickel composite hydroxide as a raw material of a positive electrode active material is heat-treated to remove moisture; a mixing step in which a lithium compound is mixed with the heat-treated nickel composite hydroxide particles to obtain a mixture; and a calcining step in which the mixture obtained in the mixing step is calcined. Then, in the process for producing a positive electrode active material, a calcined product is disintegrated to obtain a lithium nickel composite oxide, that is, a positive electrode active material.

In the heat treatment step, the nickel composite hydroxide may be heated to a temperature at which its residual moisture is removed, and the temperature of the heat treatment is not particularly limited, but is preferably 300° C. to 800° C. If the heat treatment temperature is lower that* 300° C., the decomposition of the nickel composite hydroxide does not satisfactorily proceed. This reduces the significance of performing the heat treatment step, and is therefore not industrially acceptable. On the other hand, if the heat treatment temperature exceeds 800° C., there is a case where the particles converted into a nickel composite oxide are aggregated by sintering.

In the heat treatment step, an atmosphere in which the heat treatment is performed is not particularly limited, but the heat treatment is preferably performed in an air flow, which makes it easy to perform the heat treatment.

In the mixing step, the lithium compound to be mixed with the heat-treated nickel composite hydroxide particles is not particularly limited, but for example, lithium hydroxide, lithium nitrate, lithium carbonate, or a mixture of two or more of them is preferred in terms of availability. Particularly, lithium hydroxide is more preferably used in the mixing step in consideration of ease of handling and quality stability In the mixing step, the mixing can be performed using a common nixing machine such as a shaker mixer, a Lodige mixer, a Julia mixer, or a V blender. When such a mixing machine is used, the heat-treated particles and the lithium compound may he sufficiently mixed to the extent that the structure of the composite hydroxide particles or the like is not broken.

In the calcining step, the lithium mixture is calcined at 700° C. to 850° C., particularly preferably 720° C. to 820° C. if the calcining temperature of the lithium mixture is lower than 700° C., lithium is not satisfactorily diffused in the heat-treated particles, and therefore excess lithium remains, some of the heat-treated particles remain as unreacted particles, or the crystalline structure is not sufficiently uniform, which causes a problem that a satisfactory battery characteristic cannot be achieved.

In the calcining step, the calcining time of the lithium mixture is preferably at least 3 hours, more preferably 6 hours to 24 hours. If the calcining time of the lithium mixture is less than 3 hours, there is a case where a lithium nickel composite oxide is not satisfactorily formed.

Further, in the calcining step, the lithium mixture is preferably calcined in an oxidizing atmosphere, particularly preferably an atmosphere whose oxygen concentration is 18 vol % to 100 vol %.

In the above-described positive electrode active material production process, the above-described nickel composite hydroxide that contains small amounts of sulfate radicals and chlorine as impurities is used as a raw material, and therefore when the nickel composite hydroxide is mixed with a lithium compound and the mixture is calcined, a reaction with lithium is not inhibited, which makes it possible to suppress a reduction in the crystallinity of a resulting lithium nickel composite oxide. Therefore, a positive electrode active material obtained by such a positive electrode active material production process contains small amounts of impurities remaining therein and has high crystallinity, which prevents a reduction in the capacity of a battery as a whole per weight and volume and makes it possible to obtain a positive electrode for non-aqueous electrolyte secondary batteries having a higher capacity than ever before.

<5. Non-Aqueous Electrolyte Secondary Battery>

The above-described positive electrode active material is suitably used as a positive electrode active material for non-aqueous electrolyte secondary batteries. Hereinbelow, a non-aqueous electrolyte secondary battery using the positive electrode active material will be described as an example.

The non-aqueous electrolyte secondary battery has a positive electrode using the above-described positive electrode active material. The non-aqueous electrolyte secondary battery has substantially the same structure as a common non-aqueous electrolyte secondary battery except that the above-described positive electrode active material is used as a positive electrode material, and therefore will be briefly described.

The non-aqueous electrolyte secondary battery has a structure in which a positive electrode, a negative electrode, a non-aqueous electrolyte, and a separator are housed in a case.

The positive electrode is a sheet-shaped member, and can be formed by, for example, applying a positive electrode mixture paste obtained by mixing a positive electrode active material, a conductive material, and a binder onto the surface of a current collector formed from aluminum foil and drying the applied positive electrode mixture paste.

The negative electrode is a sheet-shaped member formed by applying a negative electrode mixture paste containing a negative electrode active material onto the surface of a current collector formed from metal foil such as copper foil and drying the applied negative electrode mixture paste.

The separator may be, for example, a thin film made of polyethylene or polypropylene and having a plurality of micropores. It is to be noted that the separator is not particularly limited as long as it has the function as a separator.

The non-aqueous electrolyte is one obtained by dissolving a lithium salt as a supporting salt in an organic solvent. Examples of the organic solvent include ethylene carbonate and propylene carbonate. Examples of the electrolyte salt include $LiPF_6$, $LiBF_4$, and $LiClO_4$.

The non-aqueous electrolyte secondary battery having such a structure has a positive electrode using a positive electrode active material formed using the above-described nickel composite hydroxide as a precursor, and therefore has a high capacity per weight and volume as a whole, a low irreversible capacity, and a high level of safety.

EXAMPLES

Hereinbelow, the present invention will be described in more detail with reference to examples and comparative examples, but is not limited to these examples. It is to be noted that the examples and the comparative examples were evaluated based on measurement results obtained using devices and methods that will be described below.

A nickel composite hydroxide obtained by a crystallization step described in each of Examples 1 to 15 and Comparative Examples 1 to 3 was washed, subjected to solid-liquid separation, and dried to collect a powder, and the powder was subjected to various analyses by the following methods.

The composition of the nickel composite hydroxide was determined by measuring a sample obtained by dissolving the nickel composite hydroxide in nitric acid with an inductively-coupled plasma (ICP) emission spectrometer (ICPS-8100 manufactured by SHIMADZU CORPORATION).

The sulfate radical content of the nickel composite hydroxide was determined by measuring the amount of a sulfur element in a sample obtained by dissolving the nickel composite hydroxide in nitric acid with an ICP emission spectrometer (ICPS-8100 manufactured by SHIMADZU CORPORATION) and then converting the measured amount of a sulfur element into the mount of $SO_4$.

The chlorine content of the nickel composite hydroxide was measured with an automatic titrator (COM-1600 manufactured by HIRANUMA SANGYO Co., Ltd.).

The carbonate radical content of the nickel composite hydroxide was determined by measuring the total carbon element content of the nickel composite hydroxide with a carbon/sulfur analyzer (CS-600 manufactured by LECO) and converting the measured total carbon element content into the amount of $CO_3$.

The specific surface area of the nickel composite hydroxide was measured by a BET method using a specific surface area analyzer (QUANTASORB QS-10 manufactured by Yuasa-Ionics Co., Ltd.).

A lithium nickel composite oxide was produced and evaluated in the following manner. The nickel composite hydroxide particles produced in each of Examples and Comparative Examples were heat-treated in an air flow (oxygen: 21 vol %) at 700° C. for 6 hours, and nickel composite oxide particles were collected. Then, lithium hydroxide was weighed so that the ratio of Li/Me was 1.025, and was mixed with the collected nickel composite oxide particles to prepare a mixture. The mixing was performed using a shaker mixer (TURBULA Type T2C manufactured by Willy A Bachofen (WAB)).

Then, the obtained mixture was subjected to pre-calcination at 500° C. for 4 hours and then finally calcined at 730° C. for 24 hours in an oxygen flow (oxygen: 100 vol %), cooled, and then disintegrated to obtain a lithium nickel composite oxide.

The sulfate radical content of the obtained lithium nickel composite oxide was determined by measuring the amount of a sulfur element in a sample obtained by dissolving the lithium nickel composite oxide in nitric acid with an ICP emission spectrometer (ICPS-8100 manufactured by SHIMADZU CORPORATION) and then converting the measured amount of a sulfur element into the amount of $SO_4$.

The Li site occupancy factor of the lithium nickel composite oxide, which represents crystallinity, was calculated by Rietveld refinement from a diffraction pattern obtained using an X-ray diffractometer (X'Pert PRO manufactured by PANalytical).

It is to be noted that in each of Examples and Comparative Examples, a nickel composite hydroxide was produced using special grade reagents manufactured by Wako Pure Chemical industries, Ltd.

Example 1

A nickel composite hydroxide was produced in the following manner using the process according to the present invention.

First, 0.9 L of water was placed in a reaction vessel (5 L), and the temperature in the reaction vessel was set to 50° C. while the water in the reaction vessel was stirred. Nitrogen gas was flowed into the reaction vessel to create a nitrogen atmosphere. At this time, the concentration of oxygen in the internal space of the reaction vessel was 2.0%.

Then, appropriate amounts of a 25% aqueous sodium hydroxide solution and 25% ammonia water were added to the water contained in the reaction vessel so that the pH of the reaction solution in the vessel was adjusted to 12.8 as a pH measured on the basis of a liquid temperature of 25° C. Further, the concentration of ammonia in the reaction solution was adjusted to 10 g/L.

Then, nickel sulfate and cobalt chloride were dissolved in water to prepare a 2.0 mol/L mixed aqueous solution. The mixed aqueous solution was adjusted so that the mole ratio among the metal elements was Ni:Co=0.84:0.16. Separately, sodium aluminate was dissolved in a predetermined amount of water, and a 25% aqueous sodium hydroxide solution was added thereto so that the ratio of sodium to aluminum was 1.7. Further, sodium hydroxide and sodium carbonate were dissolved in water so that $[CO_3^{2-}]/[OH^-]$ was 0.025 to prepare an alkali solution.

The mixed aqueous solution was added to the reaction solution in the reaction vessel at 12.9 mL/min. At the same time, the aqueous sodium aluminate solution, 25% ammonia water, and the alkali solution were also added to the reaction solution in the reaction vessel at constant rates so that the pH of the reaction solution was controlled to be 12.8 (nucleation pH) while the concentration of ammonia in the reaction solution was maintained at 10 g/L. In this way, nucleation was performed by crystallization for 2 minutes 30 seconds. The addition rate of the aqueous sodium aluminate solution was adjusted so that the mole ratio among the metal elements in a slurry was Ni:Co:Al=81:16:3.

Then, 64% sulfuric acid was added until the pH of the reaction solution reached 11.6 (particle growth pH) as a pH measured on the basis of a liquid temperature of 25° C. Then, after the pH of the reaction solution reached 11.6 as a pH measured on the basis of a liquid temperature of 25° C., particle growth was performed by crystallization for 4 hours by again supplying the mixed aqueous solution, the aqueous sodium aluminate solution, 25% ammonia water, and the alkali solution while controlling the pH at 11.6 to obtain a nickel composite hydroxide.

Example 2

In Example 2, a nickel composite hydroxide was obtained and evaluated in the same manner as in Example 1 except that the alkali solution was prepared so that $[CO_3^{2-}]/[OH^-]$ was 0.003.

Example 3

In Example 3, a nickel composite hydroxide was obtained and evaluated in the same manner as in Example I except that the alkali solution was prepared so that $[CO_3^{2-}]/[OH^-]$ was 0.040.

Example 4

In Example 4, a nickel composite hydroxide was obtained and evaluated in the same manner as in Example 1 except that when sodium aluminate was dissolved in a predetermined amount of water, a 25% aqueous sodium hydroxide solution was added so that the ratio of sodium to aluminum was 1.0.

Example 5

In Example 5, a nickel composite hydroxide was obtained and evaluated in the same manner as in Example 1 except that when sodium aluminate was dissolved in a predetermined amount of water, a 25% aqueous sodium hydroxide solution was added so that the ratio of sodium to aluminum was 3.5.

Example 6

In Example 6, a nickel composite hydroxide was obtained and evaluated in the same manner as in Example 1 except that the pH in the nucleation step was 13.6.

Example 7

In Example 7, a nickel composite hydroxide was obtained and evaluated in the same manner as in Example 1 except that the pH in the nucleation step was 11.8.

Example 8

In Example 8, a nickel composite hydroxide was obtained and evaluated in the same manner as in Example 1 except that the pH in the particle growth step was 12.3.

Example 9

In Example 9, a nickel composite hydroxide was obtained and evaluated in the same manner as in Example 1 except that the pH in the particle growth step was 10.2.

Example 10

In Example 10, a nickel composite hydroxide was obtained and evaluated in the same manner as in Example 1 except that the addition rate of the aqueous sodium aluminate solution was adjusted so that the mole ratio among the metal elements in a slurry was Ni:Co:Al=78:15:7.

Example 11

In Example 11, a nickel composite hydroxide was obtained and evaluated in the same manner as in Example 1 except that the addition rate of the aqueous sodium aluminate solution was adjusted so that the mole ratio among the metal elements in a slimy was Ni:Co:Al=74:14:12.

Example 12

Example 12, a nickel composite hydroxide was obtained and evaluated in the same manner as in Example 1 except that the addition rate of the aqueous sodium aluminate solution was adjusted so that the mole ratio among the metal elements in a slurry was Ni:Co:Al=69:13:18.

Example 13

In Example 13, a nickel composite hydroxide was obtained and evaluated in the same manner as in Example 1 except that the alkali solution was prepared using potassium hydroxide as an alkali metal hydroxide and potassium carbonate as a carbonate.

Example 14

In Example 14, a nickel composite hydroxide was obtained and evaluated in the same manner as in Example 1 except that sodium carbonate was changed to ammonium carbonate and the ammonia concentration was adjusted to 20 g/L.

Example 15

In Example 15, a nickel composite hydroxide was obtained and evaluated in the same manner as in Example 1 except that the temperature in the reaction vessel was set to 35° C.

Comparative Example 1

In Comparative Example 1, a nickel composite hydroxide was obtained and evaluated in the same manner as in Example I except that the alkali solution was prepared using only sodium hydroxide so that $[CO_3^{2-}]/[OH^-]$ was 0.

Comparative Example 2

In Comparative Example 2, a nickel composite hydroxide was obtained and evaluated in the same manner as in Example 1 except that the alkali solution was prepared so that $[CO_3^{2-}]/[OH^-]$ was 0.001.

Comparative Example 3

In Comparative Example 3, a nickel composite hydroxide was obtained and evaluated in the same manner as in Example 1 except that the alkali solution was prepared so that $[CO_3^{2-}]/[OH^-]$ was 0.055.

Evaluation

The production conditions of the nickel composite hydroxides obtained in Examples 1 to 15 and Comparative Examples 1 to 3 are shown in Table 1. Further, the evaluation results of the nickel composite hydroxides are shown in Table 2, and the evaluation results of the lithium nickel composite oxides are shown in Table As shown in Table 2, the nickel composite hydroxides obtained in Examples 1 to 15 have an average particle diameter of 3 to $20_4$m, a sulfate radical content of 1.0 mass % or less, a chlorine content of 0.5 mass % or less, and a carbonate radical content of 1.0 mass % to 2.5 mass %. Further, as can be seen from Table 3, the lithium nickel composite oxides obtained in Examples 1 to 15 have a Li site occupancy factor, which represents crystallinity, of higher than 99.0%, and are therefore excellent in crystallinity and useful as a positive electrode active material.

On the other hand, as shown in Tables 1 and 2, in Comparative Examples 1 and 2, $[CO_3^{2-}]/[OH^-]$ representing the mixing ratio between the alkali metal hydroxide and the carbonate in the alkali solution was lower than 0.002, and therefore the sulfate radical content and the chlorine content were high. Further, as shown in Table 3, the lithium nickel composite oxides obtained in Comparative Examples 1 and 2 had a Li site occupancy factor, which represents crystallinity, of lower than 99.0%, and were therefore inferior to that obtained in Example 1 having the same composition ratio.

In Comparative Example 3, $[CO_3^{2-}]/[OH^-]$ representing the mixing ratio between the alkali metal hydroxide and the carbonate in the alkali solution was higher than 0.050, and therefore the carbonate radical content was high. Further, the lithium nickel composite oxide obtained in Comparative Example 3 had a Li site occupancy factor, which represents crystallinity, of lower than 99.0%, and was therefore inferior to that obtained in Example I having the same composition ratio.

Further, the nickel composite hydroxides obtained in Examples 1 to 3 and 10 to 15, in which Na/Al in sodium aluminate was in the range of 1.5 to 3.0, the pH in the nucleation step was in the range of 12.0 to 13.4, and the pH in the particle growth step was in the range of 10.5 to 12.0, had a narrower particle size distribution and a more appropriate specific surface area as compared to the nickel composite hydroxides obtained in Examples 4 to 9 in which one of these conditions was not satisfied.

As can be seen from the above results, when nickel composite hydroxide particles are produced using the process for producing a nickel composite hydroxide according to the present invention, a lithium nickel composite oxide having high crystallinity is obtained, and such a lithium nickel composite oxide is useful as a positive electrode material for high-capacity non-aqueous electrolyte secondary batteries.

TABLE 1

| | Ni:Co:Al | $[CO_3^{2}]$/[OH] | Na/Al | pH in nucleation step | pH in particle growth step | Alkali metal hydroxide | Carbonate | Concentration of ammonia [g/L] | Reaction temperature [° C.] |
|---|---|---|---|---|---|---|---|---|---|
| Example 1 | 81:16:3 | 0.025 | 1.7 | 12.8 | 11.6 | Sodium hydroxide | Sodium carbonate | 10 | 50 |
| Example 2 | 81:16:3 | 0.003 | 1.7 | 12.8 | 11.6 | Sodium hydroxide | Sodium carbonate | 10 | 50 |
| Example 3 | 81:16:3 | 0.040 | 1.7 | 12.8 | 11.6 | Sodium hydroxide | Sodium carbonate | 10 | 50 |
| Example 4 | 81:16:3 | 0.025 | 1.0 | 12.8 | 11.6 | Sodium hydroxide | Sodium carbonate | 10 | 50 |
| Example 5 | 81:16:3 | 0.025 | 3.5 | 12.8 | 11.6 | Sodium hydroxide | Sodium carbonate | 10 | 50 |
| Example 6 | 81:16:3 | 0.025 | 1.7 | 13.6 | 11.6 | Sodium hydroxide | Sodium carbonate | 10 | 50 |
| Example 7 | 81:16:3 | 0.025 | 1.7 | 11.8 | 11.6 | Sodium hydroxide | Sodium carbonate | 10 | 50 |
| Example 8 | 81:16:3 | 0.025 | 1.7 | 12.8 | 12.3 | Sodium hydroxide | Sodium carbonate | 10 | 50 |
| Example 9 | 81:16:3 | 0.025 | 1.7 | 12.8 | 10.2 | Sodium hydroxide | Sodium carbonate | 10 | 50 |
| Example 10 | 78:15:7 | 0.025 | 1.7 | 12.8 | 11.6 | Sodium hydroxide | Sodium carbonate | 10 | 50 |
| Example 11 | 74:14:12 | 0.025 | 1.7 | 12.8 | 11.6 | Sodium hydroxide | Sodium carbonate | 10 | 50 |
| Example 12 | 69:13:18 | 0.025 | 1.7 | 12.8 | 11.6 | Sodium hydroxide | Sodium carbonate | 10 | 50 |
| Example 13 | 81:16:3 | 0.025 | 1.7 | 12.8 | 11.6 | Potassium hydroxide | Potassium carbonate | 10 | 50 |
| Example 14 | 81:16:3 | 0.025 | 1.7 | 12.8 | 11.6 | Sodium hydroxide | Ammonium carbonate | 20 | 50 |
| Example 15 | 81:16:3 | 0.025 | 1.7 | 12.8 | 11.6 | Sodium hydroxide | Sodium carbonate | 10 | 35 |
| Comparative Example 1 | 81:16:3 | — | 1.7 | 12.8 | 11.6 | Sodium hydroxide | — | 10 | 50 |
| Comparative Example 2 | 81:16:3 | 0.001 | 1.7 | 12.8 | 11.6 | Sodium hydroxide | Sodium carbonate | 10 | 50 |
| Comparative Example 3 | 81:16:3 | 0.055 | 1.7 | 12.8 | 11.6 | Sodium hydroxide | Sodium carbonate | 10 | 50 |

TABLE 2

| | Sulfate radical [mass %] | Chlorine [mass %] | Carbonate radical [mass %] | Average particle diameter [μm] | (d90-d10)/average particle diameter | Specific surface area [$m^2$/g] |
|---|---|---|---|---|---|---|
| Example 1 | 0.58 | 0.11 | 1.3 | 7.2 | 0.48 | 36 |
| Example 2 | 0.45 | 0.09 | 2.4 | 6.9 | 0.47 | 34 |
| Example 3 | 0.67 | 0.15 | 1.0 | 7.0 | 0.49 | 40 |
| Example 4 | 0.60 | 0.12 | 1.2 | 7.1 | 0.57 | 52 |
| Example 5 | 0.61 | 0.12 | 1.4 | 7.3 | 0.58 | 61 |
| Example 6 | 0.57 | 0.11 | 1.5 | 5.9 | 0.57 | 65 |
| Example 7 | 0.62 | 0.14 | 1.3 | 7.7 | 0.59 | 41 |
| Example 8 | 0.61 | 0.13 | 1.4 | 5.1 | 0.60 | 45 |
| Example 9 | 0.62 | 0.14 | 1.6 | 7.0 | 0.59 | 50 |
| Example 10 | 0.62 | 0.13 | 1.5 | 6.8 | 0.51 | 41 |
| Example 11 | 0.65 | 0.12 | 1.4 | 6.7 | 0.51 | 45 |
| Example 12 | 0.64 | 0.13 | 1.5 | 6.5 | 0.53 | 46 |
| Example 13 | 0.56 | 0.12 | 1.2 | 7.5 | 0.49 | 38 |
| Example 14 | 0.55 | 0.11 | 1.4 | 7.3 | 0.48 | 33 |
| Example 15 | 0.60 | 0.12 | 1.3 | 6.5 | 0.51 | 42 |
| Comparative Example 1 | 1.20 | 0.61 | 0.5 | 7.1 | 0.49 | 31 |
| Comparative Example 2 | 1.10 | 0.54 | 0.6 | 7.0 | 0.47 | 32 |
| Comparative Example 3 | 0.55 | 0.10 | 3.1 | 7.5 | 0.59 | 62 |

TABLE 3

| | Sulfate radical content of the lithium nickel composite oxide [mass %] | Li site occupancy factor |
|---|---|---|
| Example 1 | 0.57 | 99.2 |
| Example 2 | 0.46 | 99.3 |
| Example 3 | 0.68 | 99.1 |
| Example 4 | 0.61 | 99.1 |
| Example 5 | 0.61 | 99.0 |
| Example 6 | 0.56 | 99.0 |
| Example 7 | 0.61 | 99.2 |
| Example 8 | 0.62 | 99.1 |
| Example 9 | 0.62 | 99.0 |
| Example 10 | 0.63 | 99.1 |
| Example 11 | 0.66 | 99.0 |
| Example 12 | 0.64 | 99.0 |
| Example 13 | 0.62 | 99.2 |
| Example 14 | 0.55 | 99.2 |
| Example 15 | 0.54 | 99.1 |
| Comparative Example 1 | 1.20 | 98.4 |
| Comparative Example 2 | 1.20 | 98.6 |
| Comparative Example 3 | 0.58 | 98.1 |

The nickel composite hydroxide according to the present invention can be used as a precursor of a battery material not only for electric cars driven only by electric energy but also for so-called hybrid cars that also use a combustion engine such as a gasoline engine or a diesel engine. It is to be noted that power sources for electric cars include not only power sources for electric cars drive only by electric energy but also power sources for so-called hybrid cars that also use a combustion engine such as a gasoline engine or a diesel engine, and a non-aqueous electrolyte secondary battery using a positive electrode active material obtained using the nickel composite hydroxide according to the present invention as a precursor can also be suitably used as a power source for such hybrid cars.

The invention claimed is:

1. A nickel composite hydroxide represented by a general formula:

$Ni_{z-x-y}Co_xAl_y(OH)_{2+\alpha}$ $(0.05\leq x\leq 0.35,\ 0.01\leq y\leq 0.2,\ x+y<0.4,\text{ and }0\leq\alpha\leq 0.5)$, the nickel composite hydroxide comprising:

spherical secondary particles formed by aggregation of a plurality of plate-shaped primary particles, wherein the secondary particles have an average particle diameter of 3 μm to 20 μm, a sulfate radical content of 1.0 mass % or less, a chlorine content of 0.5 mass % or less, and a carbonate radical content of 1.0 mass % to 2.5 mass %.

2. The nickel composite hydroxide according to claim 1 whose value of [(d90-d10)/average particle diameter], which is an index indicating dispersion of particle size distribution of the nickel composite hydroxide, is 0.55 or less.

3. The nickel composite hydroxide according to claim 1 whose specific surface area is 15 $m^2/g$ to 60 $m^2/g$.

4. A process for producing a nickel composite hydroxide by a crystallization reaction, the process comprising:

a crystallization step in which crystallization is performed in a reaction solution obtained by adding an alkali solution to an aqueous solution containing a mixed aqueous solution containing nickel and cobalt, an ammonium ion supplier, and an aluminum source, wherein the alkali solution is a mixed aqueous solution of an alkali metal hydroxide and a carbonate, and a ratio of the carbonate to the alkali metal hydroxide in the mixed aqueous solution represented by $[CO_3^{2-}]/[OH^-]$ or more but 0.050 or less.

5. The process for producing a nickel composite hydroxide according to claim 4, wherein in the crystallization step, an aqueous sodium aluminate solution is used as the aluminum source, and a mole ratio of sodium to aluminum (Na/Al) in the aqueous sodium aluminate solution is L5 to 3.0.

6. The process for producing a nickel composite hydroxide according to claim 4, wherein the crystallization step comprises a nucleation step and a particle growth step, and wherein in the nucleation step, nucleation is performed in the reaction solution by adding the alkali solution to the aqueous solution such that a pH of the reaction solution is 12.0 to 13.4 as a pH measured on a basis of a liquid temperature of 25° C., and in the particle growth step, the alkali solution is added to the reaction solution containing nuclei formed in the nucleation step such that a pH of the reaction solution is 10.5 to 12.0 as a pH measured on a basis of a liquid temperature of 25° C.

7. The process for producing a nickel composite hydroxide according to claim 4, wherein the alkali metal hydroxide is at least one selected from lithium hydroxide, sodium hydroxide, and potassium hydroxide.

8. The process for producing a nickel composite hydroxide according to claim 4, wherein the carbonate is at least one selected from sodium carbonate, potassium carbonate, and ammonium carbonate.

9. The process for producing a nickel composite hydroxide according to claim 4, wherein in the crystallization step, an ammonia concentration of the reaction solution is maintained in a range of 3 g/L to 25 g/L.

10. The process for producing a nickel composite hydroxide according to claim 4, wherein in the crystallization step, a reaction temperature is maintained in a range of 20° C. to 80° C.

* * * * *